(12) United States Patent
Gaia et al.

(10) Patent No.: US 10,794,202 B2
(45) Date of Patent: Oct. 6, 2020

(54) MIXED FLOW OPTIMIZED TURBINE

(71) Applicant: TURBODEN S. p. A., Brescia (IT)

(72) Inventors: Mario Gaia, Brescia (IT); Roberto Bini, Brescia (IT); Davide Colombo, Brescia (IT)

(73) Assignee: Turboden S.p.A., Brescia (IT)

( * ) Notice: Subject to any disclaimer, the term of this patent is extended or adjusted under 35 U.S.C. 154(b) by 31 days.

(21) Appl. No.: 16/097,607

(22) PCT Filed: May 8, 2017

(86) PCT No.: PCT/IB2017/052668
§ 371 (c)(1),
(2) Date: Oct. 29, 2018

(87) PCT Pub. No.: WO2017/195094
PCT Pub. Date: Nov. 16, 2017

(65) Prior Publication Data
US 2019/0136704 A1    May 9, 2019

(30) Foreign Application Priority Data
May 10, 2016   (IT) .................. 102016000047755

(51) Int. Cl.
*F01D 9/06* (2006.01)
*F01D 5/04* (2006.01)
(Continued)

(52) U.S. Cl.
CPC ............... *F01D 9/06* (2013.01); *F01D 5/041* (2013.01); *F01D 9/045* (2013.01); *F02C 9/18* (2013.01);
(Continued)

(58) Field of Classification Search
CPC . F01D 9/06; F01D 9/045; F01D 5/041; F05D 2240/128; F05D 2220/32; F02C 9/18
See application file for complete search history.

(56) References Cited

U.S. PATENT DOCUMENTS 4,458,493 A * 7/1984 Amir ...................... F01D 17/00
                                                                    415/143
5,598,706 A * 2/1997 Bronicki ................... F03G 7/04
                                                                    60/641.2
(Continued)

FOREIGN PATENT DOCUMENTS

WO     WO-2015189718 A1 * 12/2015 ............. F01D 9/045

*Primary Examiner* — Shafiq Mian
(74) *Attorney, Agent, or Firm* — R. Ruschena Patent Agent, LLC

(57) ABSTRACT

A mixed flow turbine (1) for the expansion phase of steam thermodynamic cycles of an organic Rankine cycle provided with a first section (A) in which a first expansion of a main flow of working fluid takes place, in a substantially radial direction having at least one stator stage (S1, S2, . . . Sn) and at least one rotor stage (R1, R2, . . . Rn) of a second section (B) in which a second expansion of the main flow of the working fluid takes place in a substantially axial direction having at least one stator stage and at least one rotor stage and, between the first and the second section, with at least one angular stator stage (S4) comprising an array of angular blades which deflect the main flow of working fluid from the initial radial direction to a substantially axial direction. The turbine (1) is provided with means for injection (60) and/or means for extraction (70) of a second flow of working fluid, placed in proximity of the stator stage (S4).

14 Claims, 9 Drawing Sheets

(51) Int. Cl.
 *F02C 9/18* (2006.01)
 *F01D 9/04* (2006.01)
(52) U.S. Cl.
 CPC .... *F05D 2220/32* (2013.01); *F05D 2240/128* (2013.01)

(56) References Cited

U.S. PATENT DOCUMENTS

| | | | |
|---|---|---|---|
| 7,797,940 B2* | 9/2010 | Kaplan | F01K 25/08 60/641.2 |
| 9,447,701 B2* | 9/2016 | Omoruyi | F01K 9/00 415/1 |
| 9,726,047 B2* | 8/2017 | Gaia | F01D 1/04 415/1 |
| 2013/0047614 A1* | 2/2013 | Gaia | F01K 7/22 60/653 |
| 2014/0363268 A1* | 12/2014 | Gaia | F01K 25/10 415/1 |

* cited by examiner

MIXED FLOW OPTIMIZED TURBINE

BACKGROUND OF THE INVENTION

1. Field of the Invention

The present invention relates to a mixed flow turbine for the expansion phase of thermodynamic vapor cycles, in particular an organic Rankine cycle (hereinafter also called ORC cycle). The turbine is optimized in its performance as being provided with injection and/or extraction means of an organic working fluid.

2. Brief Description of the Prior Art

As is known, a thermodynamic cycle is defined as a finite succession of thermodynamic transformations (such as isotherms, isocores, isobars or adiabatics) at the end of which the system returns to its initial state. In particular, an ideal Rankine cycle is a thermodynamic cycle made of two adiabatic and two isobaric transformations, with two phase changes from liquid to vapor and from vapor to liquid. Its aim is to transform heat into work. Such cycle is generally mainly adopted in power generation plants for the production of electric energy, and uses water as engine fluid, both in liquid and in vapor form, and the corresponding expansion occurs in the so-called "steam turbine".

More specifically, organic Rankine cycles (ORC) have been designed and used, using high molecular mass organic fluids for the most different applications, especially also for the exploitation of low-medium enthalpy thermal sources. As with other vapor cycles, an ORC cycle plant includes one or more pumps for the supply of an organic working fluid, one or more heat exchangers for carrying out preheating, vaporization and possibly overheating or heating phases in supercritical conditions of the same working fluid, a fluid-driven vapor turbine, mechanically connected to an electric generator or a working machine, a capacitor returning the organic fluid to the liquid state and a regenerator to recover heat downstream of the turbine and upstream of the capacitor.

Particular attention is paid to the smooth running of the turbine as the efficiency of the ORC, as well as a traditional vapor cycle, largely depends on the amount of mechanical work which the turbine is able to extract.

If a source with variable temperatures, such as a liquid geothermal fluid giving heat by changing its own temperature, is available, the efficiency of an ORC plant can be increased by using a thermodynamic cycle at two pressure levels. In fact, the presence of at least two pressure levels allows for better coupling between the heat profiles of the hot source and those of the organic fluid during preheating, evaporation and possibly overheating phases.

A multi-level plant can be obtained either by expanding the organic vapor generated at different pressures on as many turbines, or by providing vapor injections upstream of a determined intermediate stage of the same turbine. The second solution, where applicable, may be economically more convenient.

Let us consider, for example, a single turbine and vapor generated at two different pressure levels.

The vapor with higher pressure (called the main flow) enters upstream of the first stage of the turbine and expands along all the stages, whereas the vapor with lower pressure enters the turbine at one of the intermediate stages, typically where its pressure is close to that of partially expanded vapor, by mixing itself with this and continuing its expansion along with the main flow.

Vapor extraction from an intermediate stage of the turbine can be useful in co-generation plants, where the electrical generation is made together with a thermal user (industrial process, heating network, . . . )—Usually the thermal user utilizes the condensation heat of the organic fluid. As the user requires heat at a higher temperature than room temperature, the condensing temperature rises accordingly, with a negative impact on the efficiency of the cycle (if compared with similar power generation solutions just for electrical production, on the other hand it can benefit from a condensation temperature just slightly above ambient).

If the thermal power required by the user is just a fraction of that available at the capacitor and at higher temperature, it may be advantageous to use just a portion of vapor, which is already partially expanded in the turbine, to provide heat to the thermal user at the required temperature level. In such case, the entire organic vapor flow enters the turbine and is expanded in at least one stage; then, a certain amount of vapor is extracted from the turbine and used to give heat to the thermal user while the remaining vapor continues to expand at the next turbine stages.

In an axial turbine, the injection or extraction of vapor can occur simply through a channel located upstream of a given stator.

Depending on the adopted solution, such injection or extraction may result in an increase of the axial extension of the turbine, which can adversely affect the rotary dynamics of machines, particularly if the turbine has a cantilever mounting with respect to its bearings.

In a centrifugal radial turbine, a vapor injection or extraction can be achieved by providing an inlet/extraction duct between one stage and another; in such case, the radial distance between the stages increases, which corresponds to an increase in the size of the rotor disc. Such technique has long been known, as can be shown for example, from U.S. Pat. No. 1,378,506 dating back to the twenties of the last century. Patent application WO2013/150018 proposes an alternative solution which does not affect the rotor radial extension (the injector downstream of the stator is powered by two radially parallel flows coming from the upstream rotor and the injector respectively).

The Applicant has found particularly interesting to realize a possible vapor injection or extraction for a radial-axial turbine, characterized by at least one centrifugal radial stage, followed by at least one axial stage.

In the Applicant's previous Patent applications, WO2013/108099 A2 and WO2015189718 A1, a radial axial turbine is described, characterized by the presence of an array of angular stator blades which divert the flow from the radial-centrifugal direction to the axial direction. The same angular blades act as a stator for the first axial stage. In the second of such patent applications, the vapor abduction chamber for a mixed flow turbine is also described.

In the case of a vapor abduction, the high-pressure vapor is processed by at least one first centrifugal radial stage. Vapor with lower pressure is introduced upstream of the angular blades.

An equivalent solution can be adopted in case of extraction.

With reference to FIG. 1, however, the presence of a fluid injection and/or extraction duct increases the radial length of the first rotor disc, in particular the radial distance between the output of the last centrifugal radial stage and the base of the rotor blades of the first axial stage.

There is therefore a need to define for a mixed flow vapor turbine, means for injection and/or extraction of a working flow without the above-mentioned drawbacks.

SUMMARY OF THE INVENTION

Purpose of the present invention is to provide a mixed flow turbine, characterized by means for a vapor injection or extraction at an intermediate pressure, which are located within the angular stator stage, which do not require a radial distance increase between stator and rotor of a radial stage or the radial distance between the last radial rotor and the base of the rotor blades of the axial stage, or the distance between stator and rotor of an axial stage, so that the injection of the second flow of working fluid takes place within the angular stator stage.

The means for injection/extraction according to the present invention are integrated in the expansion turbine having the features disclosed in the independent product claim.

In particular, the turbine comprises arrays of stator blades and rotor blades, mutually alternated, and a support shaft of the rotor blades rotatable on the relative rotary axis. In a first section of the turbine, the arrays of static blades and the arrays of rotor blades are alternating in a substantially radial direction; in a second section of the turbine the arrays of stator and rotor blades are alternating in a substantially axial direction.

Between the first and second section of the turbine there is at least one array stator or rotor blades, defined as angular blades, configured to divert the working fluid from an substantially radial expansion direction to an absolute motion axial expansion direction, and tangentially with respect to the absolute motion or the relative motion, depending on whether the angular blades are respectively stator or rotor blades.

The means for injection/extraction of working fluid are characterized by being located within the stator stage of the angular blades. In fact, the curvilinear shape of such stage naturally leaves a space available for inserting chambers and/or auxiliary injection or extraction ducts for the working fluid, without the need of an increase in the size of the turbine and in particular an increase in the radial size of the rotor disc or an increase in the axial extension of the turbine itself.

As the injection of working fluid or even its extraction have a minimal or in any case negligible impact on the turbine's performance, it is necessary that the speed vectors of both the main flow (the one which performs the full expansion in the turbine) and the second flow (the one which is injected or extracted) are almost coincident regarding intensity, direction and orientation. Any deviation from such condition, obviously ideally, will however lead to a disorder of the main flow, due to enthalpy leakage of the working fluid. The stator with angular blades works better than any other stator or rotor group in the injection or extraction of fluid for the "curved" geometry of such stage. The insertion in this zone of the injection or extraction of fluid permits to make more accurately the combination or mixing between the two flows, thus reducing the inevitable fluid scrambling with different speeds in terms of absolute value and/or direction and resulting in turbulent leakages, with a lower impact on the turbine's performance, so ensuring the benefits previously outlined in terms of overall cycle efficiency.

Furthermore, the injection of the second flow of working fluid into the angular stator stage causes the injected flow to benefit from the subsequent expansion of the main fluid within the same stage so that it can more easily align with the main flow lines. If the injection occurs instead within a duct without blades (for example in the space between a rotor array and the next stator array), the mixing between the two streams would be in a less controlled and regular way.

Further preferred and/or particularly advantageous methods for implementing the invention are described in accordance with the features disclosed in the annexed dependent claims.

BRIEF DESCRIPTION OF THE DRAWINGS

The invention will now be described with reference to the accompanying drawings, which illustrate some examples of non-limiting embodiments, in which.

DETAILED DESCRIPTION OF THE INVENTION OR OF THE PREFERRED EMBODIMENT

The invention relates to plants working according to an organic Rankine cycle (ORC) or water vapor cycle as is best shown at the end of the detailed description. In the following an ORC plant is described, but similar arguments and conclusions can be drawn in the case of a traditional water vapor cycle, although it should be emphasized that in the case of an ORC the number of stages is generally very smaller, being the ORC characterized in function of the type of fluid adopted, with a low overall enthalpy reduction with respect to water vapor. Hence, the ORC will in general have a greater impact on the losses resulting from mixing flows in the space between successive arrays.

Within the scope of the present invention, as it is commonly observed in the turbine field, an axially-symmetrical coordinate system in with a general plan on which the rotary axis of the turbine shaft lies, is called a meridian plan. The direction orthogonal to the axis of the machine and lying in the meridian plan considered is defined as the radial direction. With the tangential direction in a point of the meridian plan, the direction is identified, which is orthogonal to the meridian plan and orthogonal to the radial direction passing through such point. A direction parallel to the X axis of the machine is defined as the axial direction.

Figure 1:
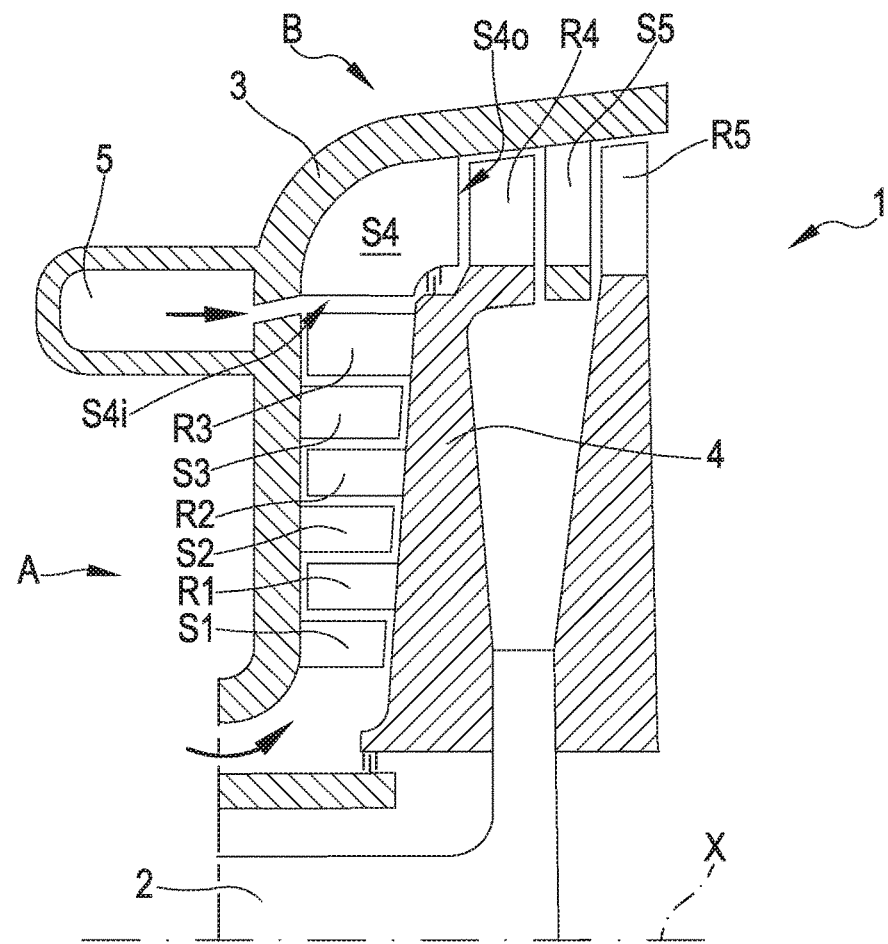
FIG. 1 is a partial section of a mixed flow turbine provided with a chamber for supplying a working fluid according to the known art.

FIG. 1 is a partial view, in an axial symmetrical section, of a mixed flow turbine 1. In the Figure, as will be explained below, the turbine 1 is provided with a system for the abduction of a working fluid, according to the known art. However, the same turbine will be used as a non-limiting example for describing the embodiments of the present invention.

The turbine comprises a shaft 2 which extends in an axial direction X, an outer casing 3 or volute, and an array of stator blades S1 to Sn, and of rotor blades R1-Rn, mutually alternated, which are disposed according to the scheme S1-R1; S2-R2; Sn-Rn, and so on, where "n" represents a general stage (in FIG. 1 the total number of stages is five).

In particular, the turbine 1 is conceptually divided in a first section A and in a further section B according to the direction of expansion of the working fluid vapor. In the first section A, defined as with high pressure, a first expansion of the working fluid is expected in a radial or orthogonal direction of the X axis; in the second section B, defined as with low pressure, a second expansion of the working fluid is expected either in a substantially axial direction, or parallel to the X axis. Between the two turbine sections A and B at least an angular stator stage S4 is provided, comprising an array of stator angular blades serving as a function for diverting the flow of working fluid from the initial radial direction of expansion to the axial direction, and also to the tangential direction (direction orthogonal to the Figure, looking at FIG. 1).

In particular, the turbine 1 shown on FIG. 1 comprises three radially arranged stages S1-R1; S2-R2; S3-R3 disposed upstream of the angular blades of the angular stator stage S4 and two axially arranged stages S4-R4; S5-R5, disposed downstream of the angular blade of the angular stator stage S4. In general, the number of upstream and downstream stages of the angular blades may be different.

The angular stator blades of the angular stator stage S4 are constrained to the horizontal volute 3 and as shown in the Figure extend according to a curvilinear path (seen in the meridian section). If seen in the meridian section (FIG. 1), the inlet edge S4 of the blades of the angular stator stage S4 preferably extends in the axial direction, and the outlet edge S4o extends in the radial direction; therefore, each blade of the angular stator stage S4 extends along a curved path with a fluid-dynamic channel in order to reduce or cancel (with reference to the upstream values of the blades) the mean radial component of the working fluid flow and to generate the axial and tangential components.

Preferably, the stator blades of the angular stator stage S4 extend when seen from an observer on the rotary axis X, with a first substantially radial section between a base and a peripheral portion at which the blades are circumferentially or tangentially curved, and subsequently have a diverted inter-blade channel, and are progressively disposed in the tangential and axial directions.

In FIG. 1, the radial stages are so represented that the rotor disc 4 and the case (or in any case a stator portion) diverge from each other, so that the height of the blades increases from a stage to another. In fact, in a centrifugal radial turbine, it is possible that the blade height remains constant or even decreases, as the increase in the volumetric flow rate due to the expansion is already at least partially compensated by the increase in the passage area, which increases with the radius.

In the same FIG. 1, a chamber 5 is shown for the abduction of a working fluid, whose effects have already been described in the foregoing.

Figure 2:
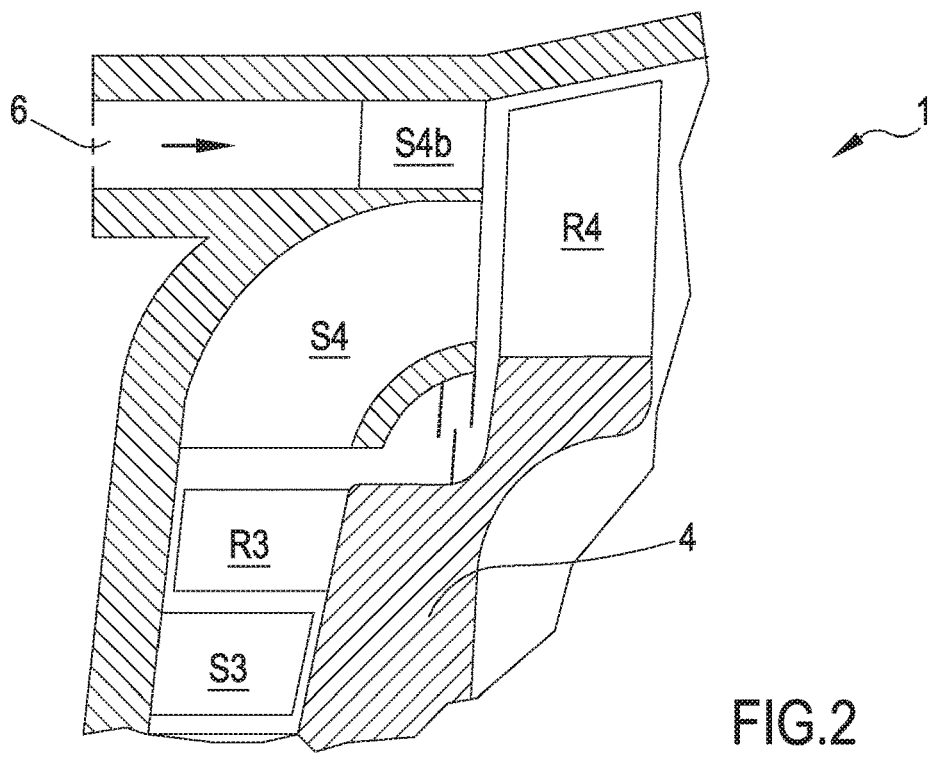
FIG. 2 is a partial section of the mixed flow turbine of FIG. 1, provided with a working fluid injection system according to a first embodiment of the present invention.

Referring to FIG. 2, the same mixed flow turbine 1 is provided with means for injection of working fluid, according to an embodiment of the present invention. The Figure shows the last radial stage S3-R3, the angular stator stage S4 with angular blades and the first rotor of the axial stage R4.

In the configuration of FIG. 2, the vapor generated at the second pressure level (lower than the pressure value of the first level) is injected into the turbine by means of the injection duct 6 and is accelerated in a further stator stage S4b, which radially follows the angular stator stage S4 with angular blades. Thus, the radial dimension of the rotor disc 4 is not influenced by the presence of the injection duct, with the exception of the increase of height of the blade R4, as a consequence, it is strictly necessary to process the flow increase resulting from the intermediate vapor injection. At the same time, the distance between a stator stage and the corresponding rotor stage shall not be increased, neither for the radial portion nor for the axial portion.

In addition, the injected vapor which in the known configuration of FIG. 1 abruptly mixes with the main flow within S4, thus causing strong mixing losses, in the configuration of FIG. 2 is already guided in the direction of the main flow from the blades of the stator stage S4b. In any case, if the outlet conditions from the two stator stages S4 and S4b are slightly different (for example, in terms of pressure and/or speed), mixing vortexes will be formed between the two flows, disturbing the motion field in the rotor R4. It is evident that the design of the injection means must be done in such a way to eliminate or otherwise minimize such differences.

Figure 3:
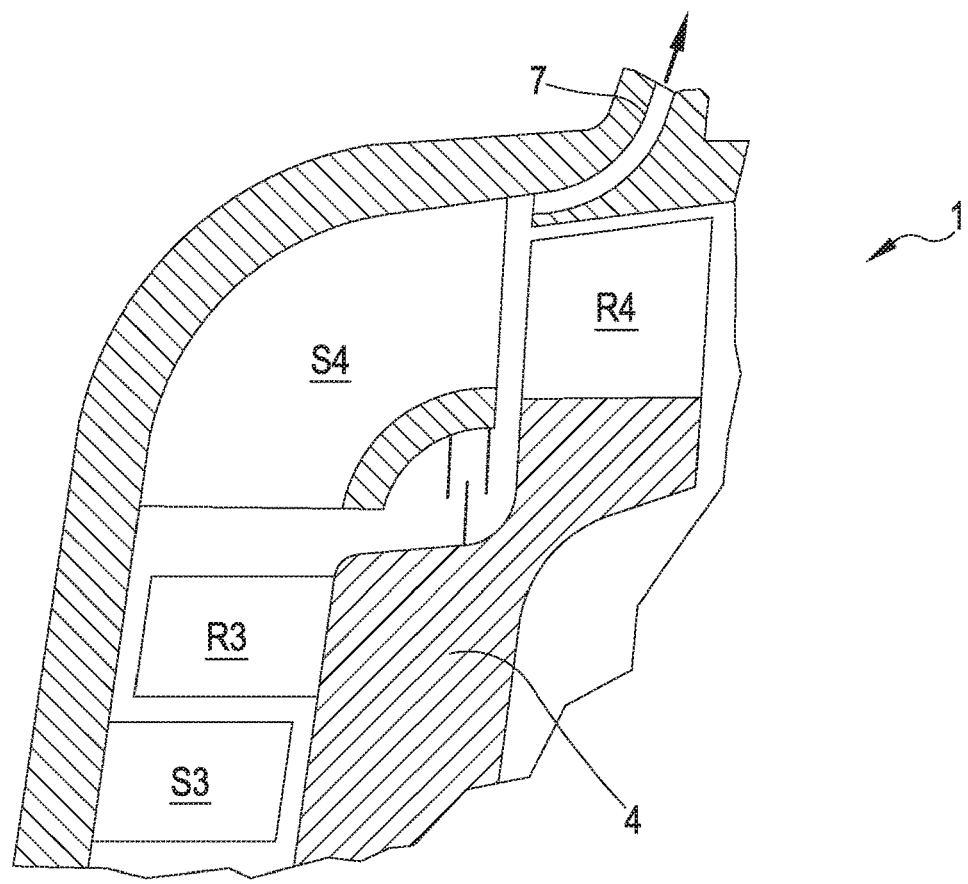
FIG. 3 shows a corresponding embodiment of FIG. 2 but in this case used for the extraction of working fluid.

FIG. 3 shows an embodiment equivalent to that of FIG. 2 but in this case used for the extraction of working fluid. The vapor is drawn downstream of the angular stator stage S4, so that the outlet duct 7 is placed downstream of the outlet edge S4 of the angular stator stage S4 without the need to increase the radial dimension of the rotor disc 4 or its protruding axial extension. The extraction duct 7 can be made by forming a diffuser, in order to recover at least a portion of the kinetic energy which would otherwise be lost.

Figure 4:
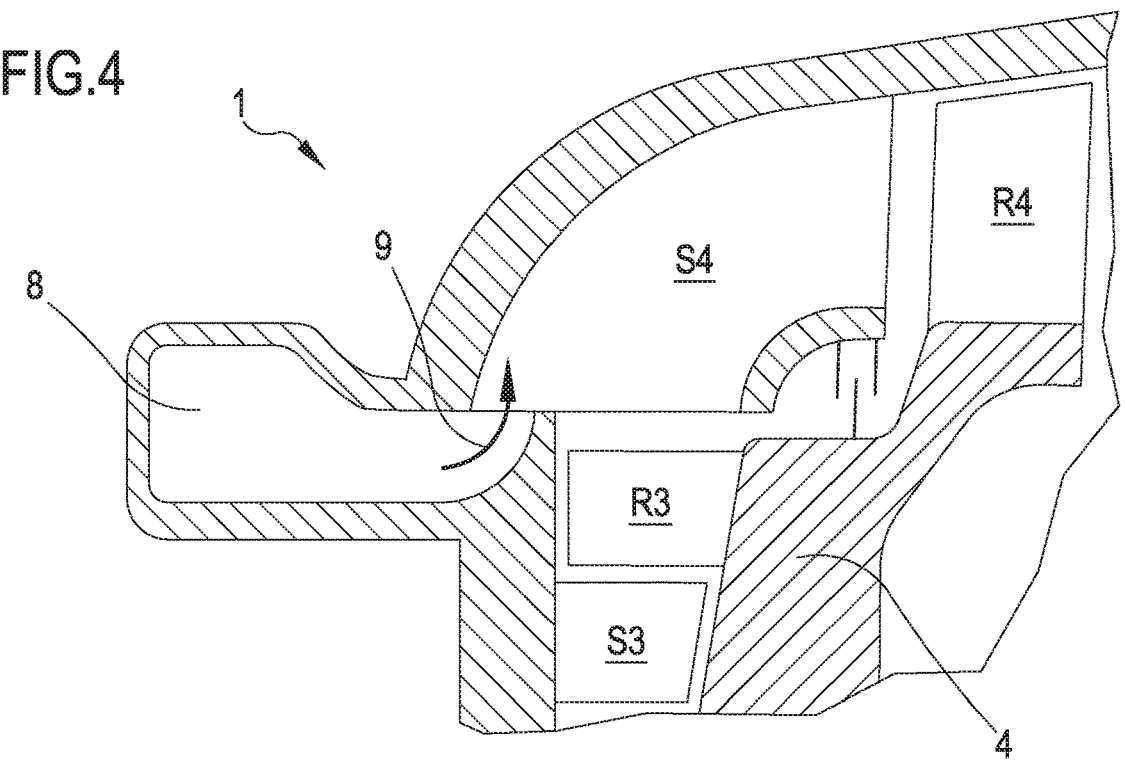
FIG. 4 is a partial section of the mixed flow turbine of FIG. 1, provided with a system for injection of working fluid, in a second embodiment of the present invention.

Referring to FIG. 4, an alternative embodiment of the working fluid injection means is described. The Figure shows the same detail of the turbine as in previous Figures, namely the last radial stage S3-R3, the stator angle S4 with angular blades and the first rotor of the axial blade R4.

According to this configuration, the vapor from the abduction chamber 8 is injected directly into the inlet of the angular stator S4 through the inlet 9, with an inclination substantially similar to that of the main flow.

Figure 5:
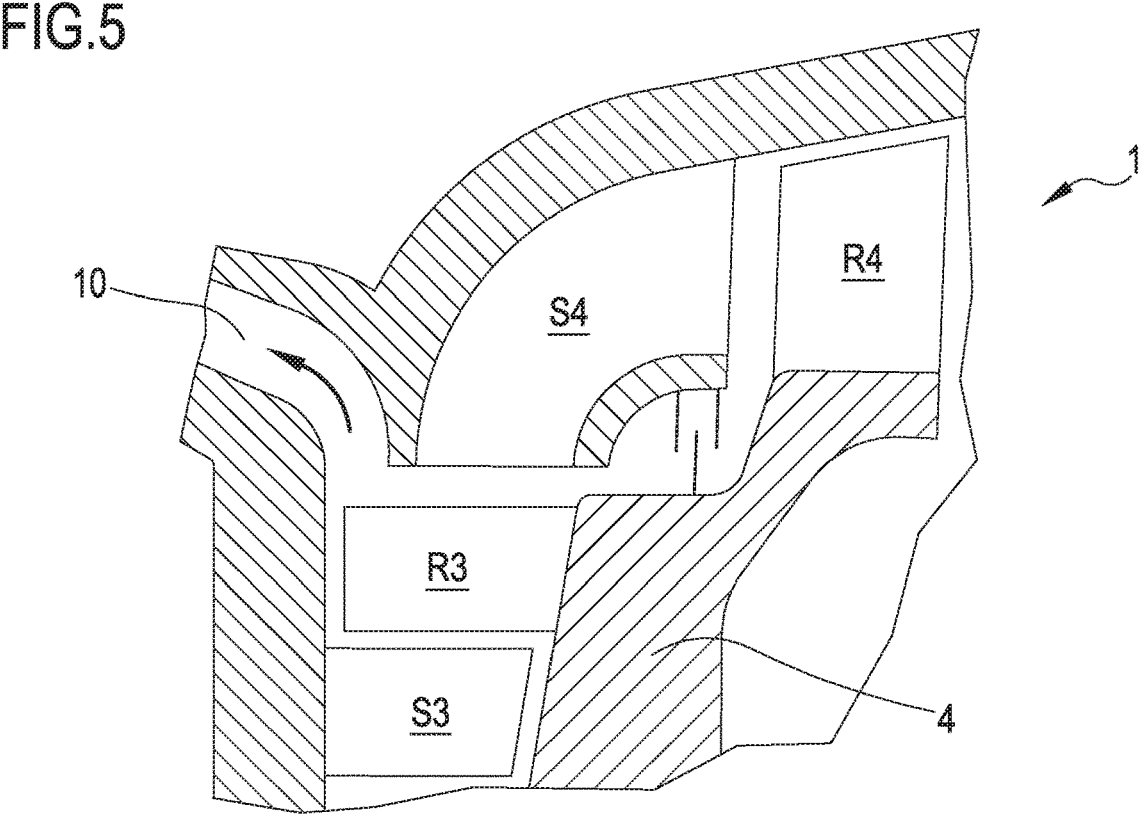
FIG. 5 shows a corresponding embodiment of FIG. 4 but in this case used for the extraction of working fluid.

The similar configuration for the extraction of the working fluid is shown in FIG. 5. According to this configuration, the extraction takes place upstream of the stator stage S4, so that the extraction duct 10 is placed in front of the exhaust of the rotor R3.

Figure 6A:
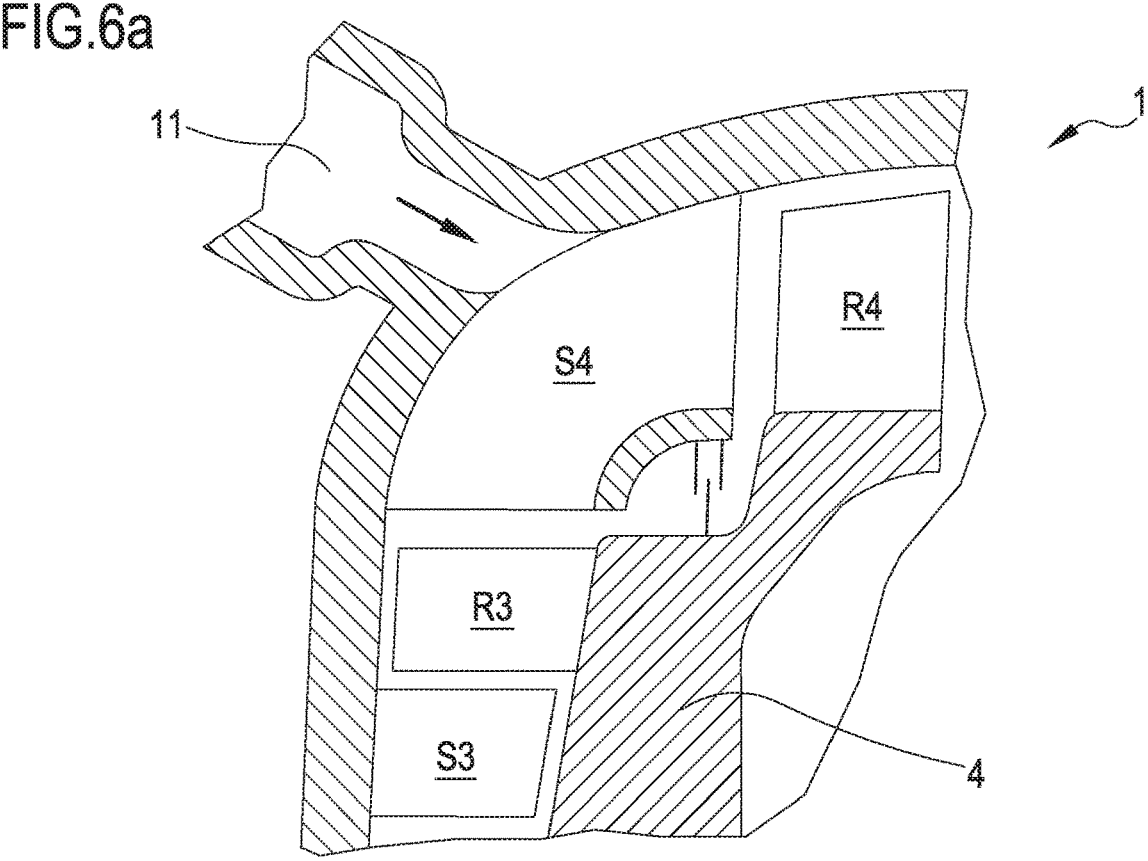
FIGS. 6*a* and 6*b* are a partial sectional view of the mixed flow turbine of FIG. 1, provided with an injection system (FIG. 6*a*), and a working fluid extraction system (FIG. 6*b*) according to a third embodiment of the present invention.
Figure 6B:
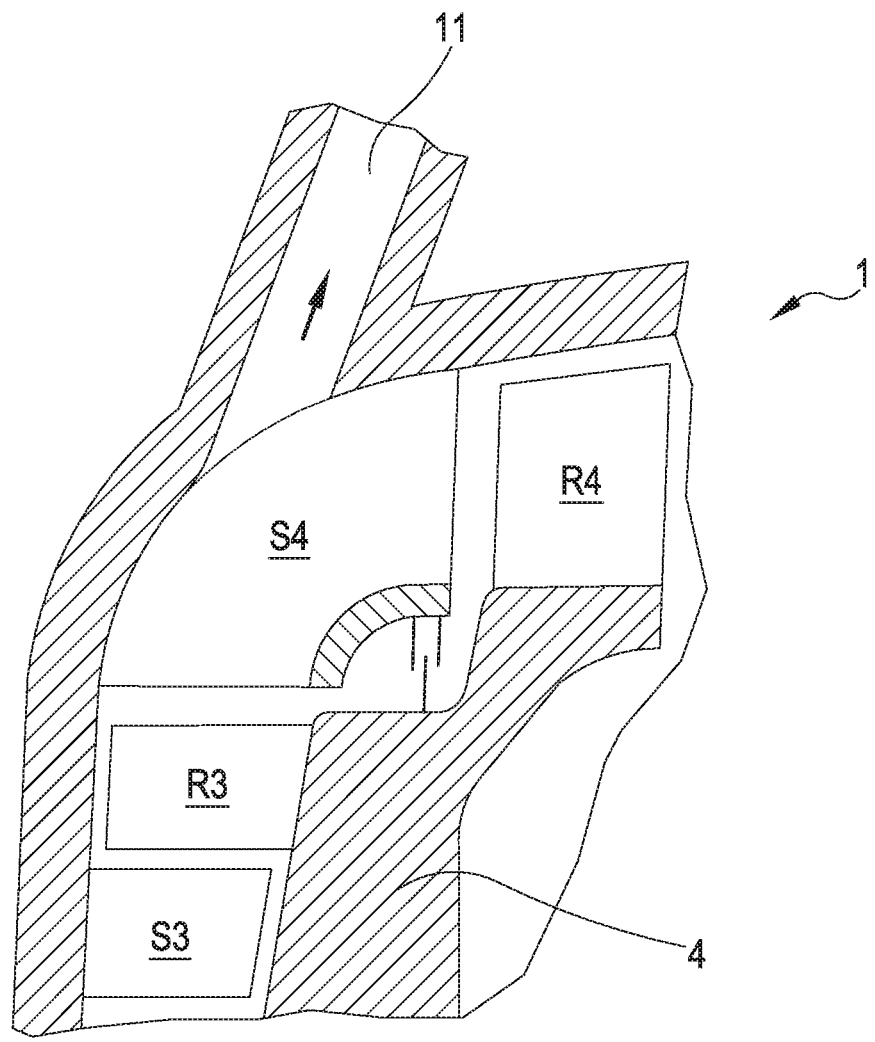

With reference to FIGS. 6a and 6b, a third embodiment of the present invention is shown therein. Also in this configuration, the Figure shows the last radial stage S3-R3, the angular stator stage S4 with angular blades and the first axial rotor R4. In this case, the injection or extraction of working fluid takes place by means of a chamber or duct 11, in an intermediate position of the stator angular stage S4, preferably so that the divert of flow at the meridian plane has already occurred about as a half, making it easier and clearer to position the supply chamber, which does not disturb either the radial or the axial stages. In this way, both in the case of injection and of extraction, there is still a substantial further expansion and acceleration of the stator flow path, allowing for a fluid resetting and a reduction in flow vortices.

Figure 7:
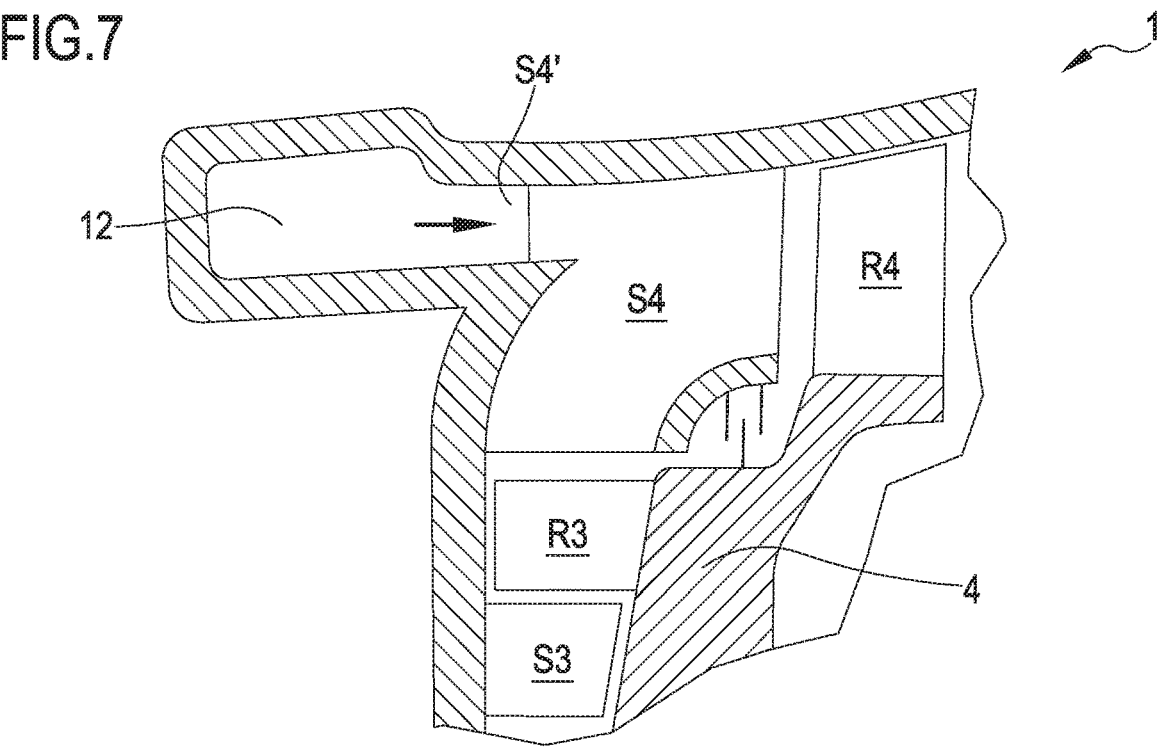
FIG. 7 shows the partial section of the mixed flow turbine of FIG. 1, provided with a working fluid injection system according to a fourth embodiment of the present invention.

A fourth configuration of the invention is shown in FIG. 7.

This FIG. 7 still shows the same partial section of the mixed flow turbine of FIG. 1. This configuration is almost equivalent to the previous one, with the only difference that the angular blades S4' of the stator angle stage S4 extend into the additional inlet duct 12 so as to better guide the second flow.

Figure 8:
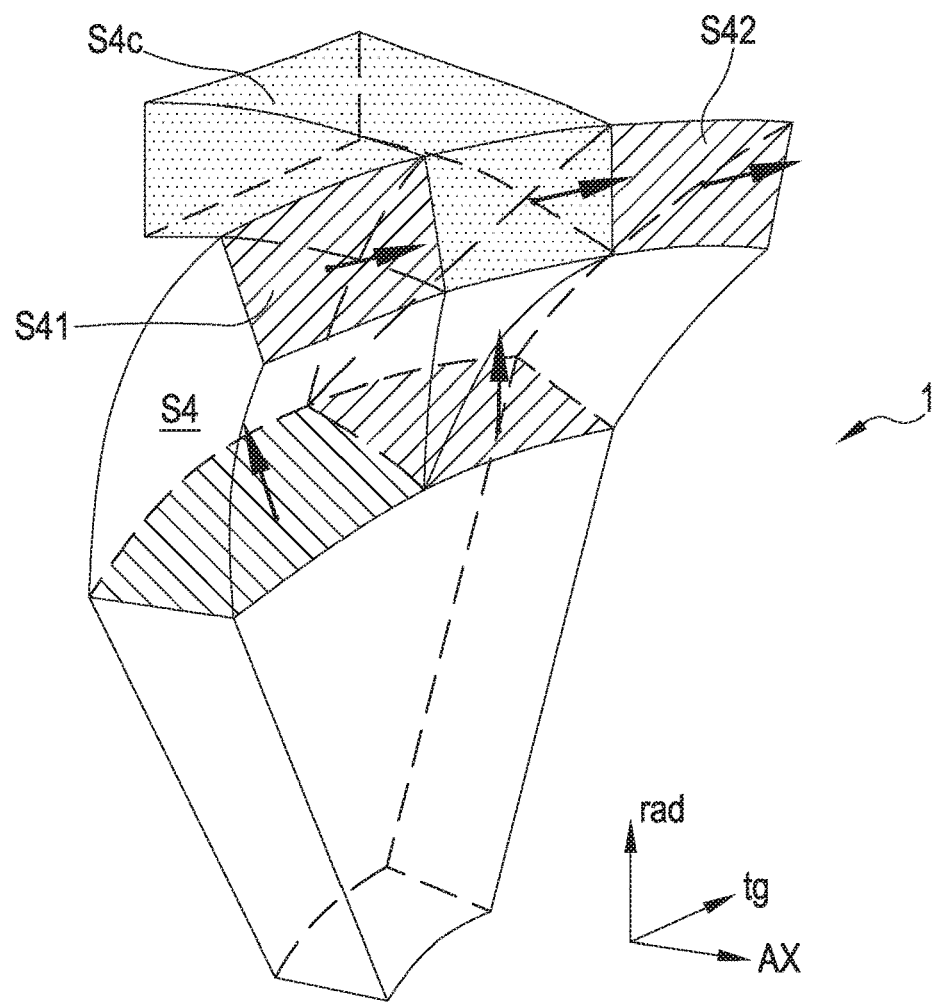
FIG. 8 is a partial perspective view of the stator with angular blades of the mixed flow turbine of FIG. 1, provided with a system for injection of working fluid according to a fifth embodiment of the present invention.

A further vapor injection solution is shown in FIG. 8. This Figure shows a partial perspective view of the angular stator stage S4 with angular blades. According to this fifth embodiment, the main flow outgoing from the centrifugal radial stages is conveyed by the blades of the stator angular stage S4 in an axial direction as in the previous cases. However, the stator angular stage S4 is so shaped that each duct S41, S42 of the blades and so on diverges by detaching from the adjacent one, leaving space for the inlet of the second flow, is also accelerated and driven by appropriate stator ducts S4c. In this way, the first axial rotor will have inlet sectors alternately powered by the main flow and by the second flow.

Figure 9:
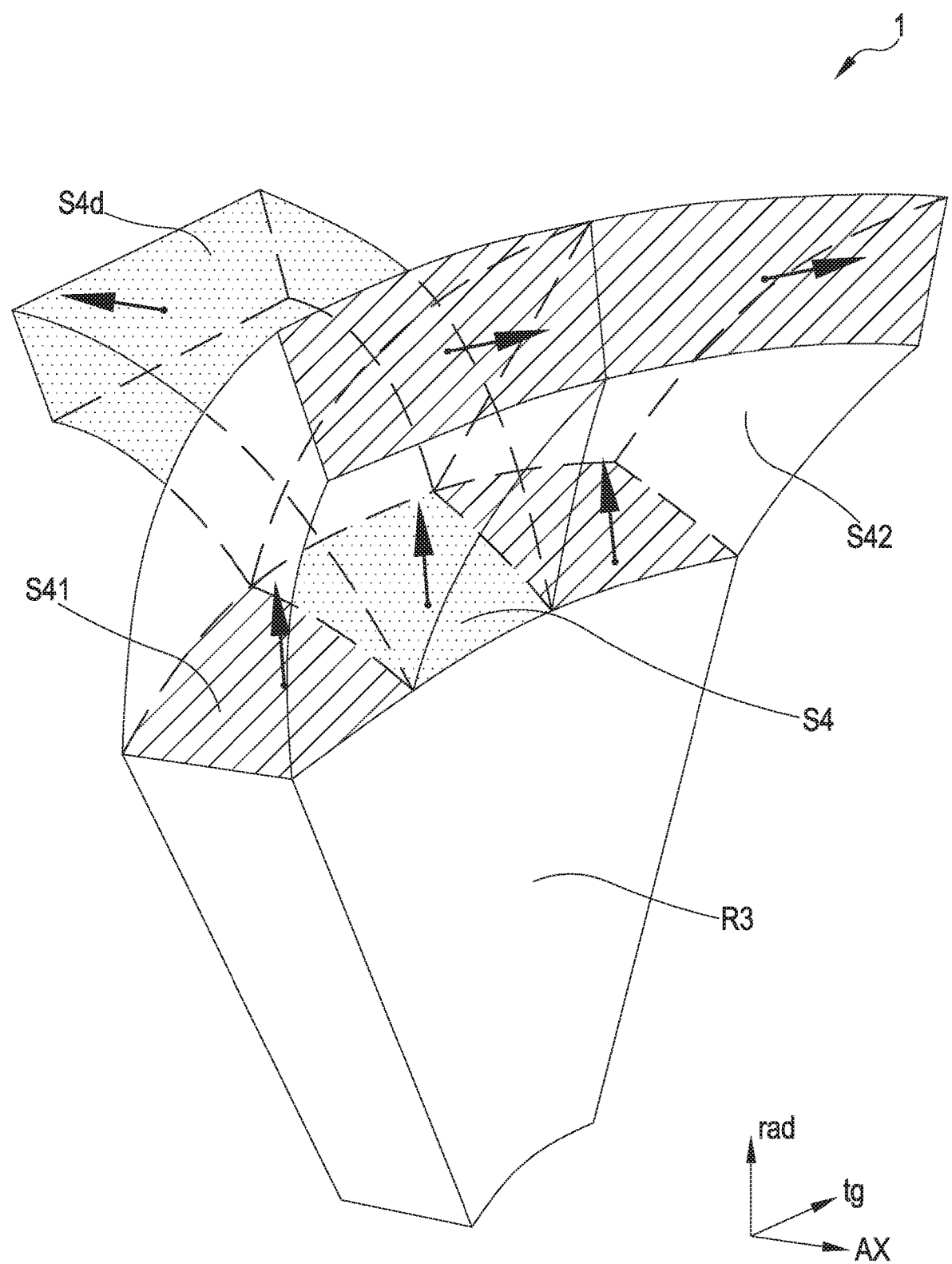
FIG. 9 shows an embodiment equivalent to FIG. 8 but in this case used for the extraction of working fluid.

FIG. 9 shows an embodiment equivalent to that of FIG. 8, but in this case the same principle is applied to the case of working fluid extraction: the vapor outgoing from the rotor stage R3 will alternately supply the blade ducts S41, S42, . . . connected to the subsequent axial stages and to the stator ducts (S4d) which instead convey vapor outside the turbine.

In FIGS. 8 and 9, the channels S41, S42, S4c and S4d are represented by a substantially meridian extension in the passage of flow from radial to axial directions; they will in fact be bent in the tangential direction to favor the birth of the tangential component required at the inlet of the first axial rotor.

Figure 10:
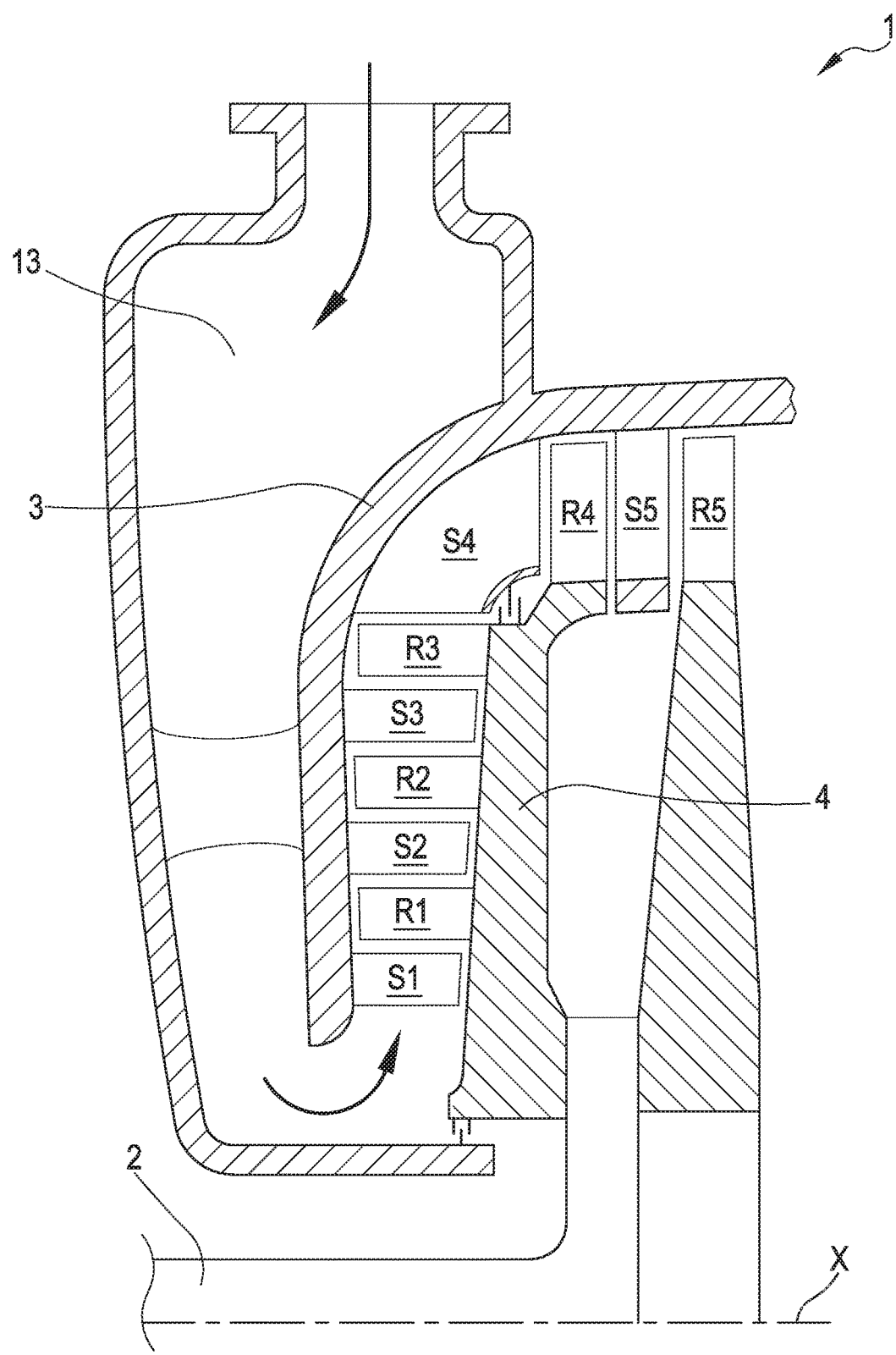
FIG. 10 is a partial section of the mixed flow turbine of the preceding Figures showing the main supply duct of the working fluid according to the known art.
Figure 11:
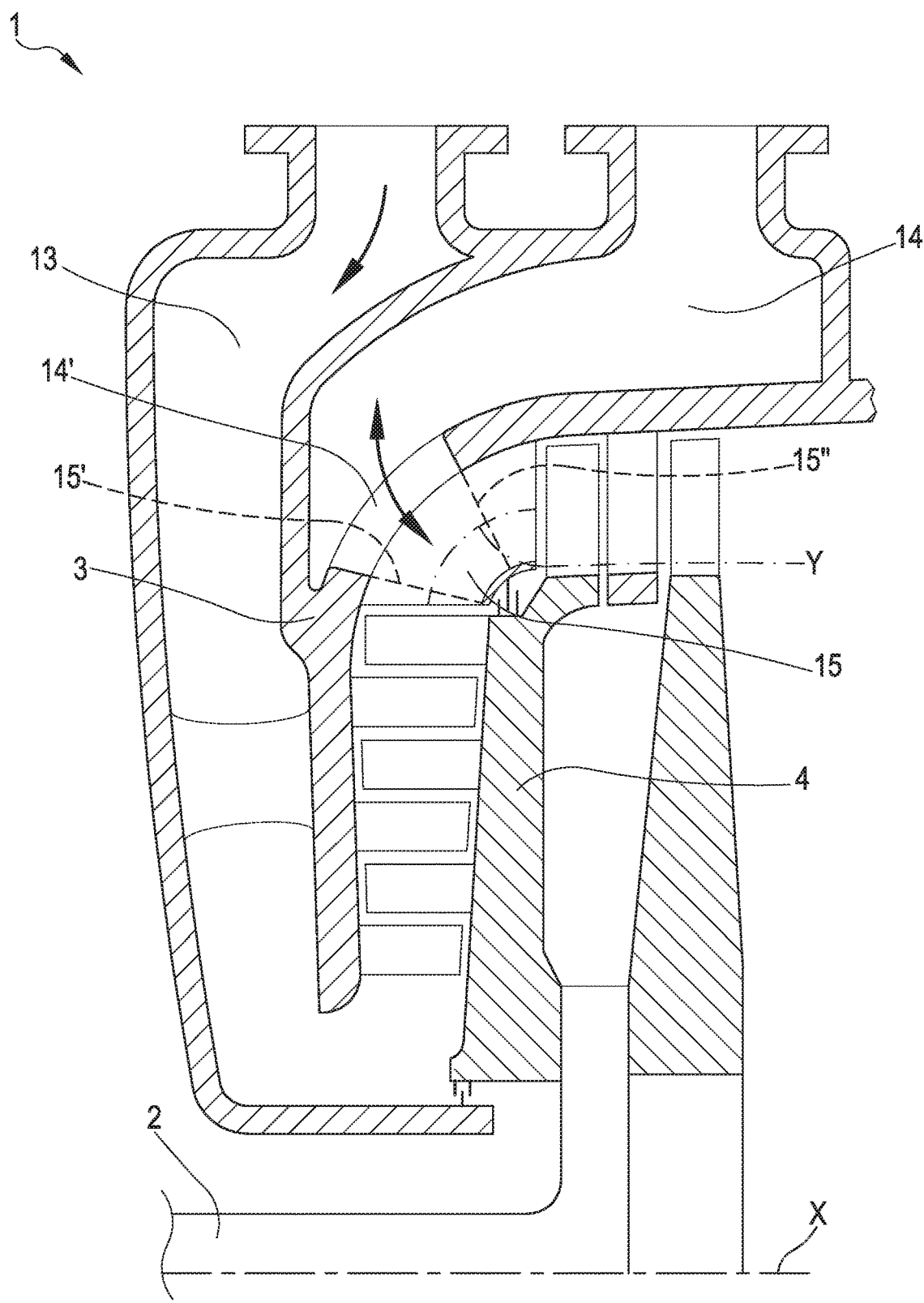
FIG. 11 shows the same turbine of FIG. 10 with the addition of a injection/extraction duct of the working fluid according to a further embodiment of the present invention, FIGS. 12 and 13 schematically show an organic Rankine cycle plant, comprising a mixed flow turbine according to the present invention, respectively for injection and extraction.

FIG. 10 shows the mixed flow turbine 1, highlighting the position of the main supply duct 13 of the working fluid. It is easy to imagine how the embodiments of the injection/extraction means described in FIGS. 6a, 6b, 7, 8 and 9 have a minimal or even zero impact on the geometry of the main supply duct 13, permitting to not change the structure of the turbine and in particular of its fixed case. Another example is shown in FIG. 11, whereas the embodiment of the invention described therein includes an injection/extraction duct 14 of the working fluid, always in the angular (or from the angular) stator stage S4. Also this Figure has been shown in order to demonstrate how such injection or extraction means of working fluid have a very modest impact on the main supply duct 13 of the turbine 1.

Finally, all the configurations of the different working fluid injection or extraction means are characterized by being located within the stator stage of the angular blades.

The curved shape of this stage naturally leaves space for insertion of injection or extraction chambers, auxiliary ducts, additional stators, in other words all the means considered for injection or extraction. In this way, such means do not require any increase in size of the turbine and in particular do not require the increase in the radial dimensions of the rotor disc or the increase in turbine cantilever extension.

In fact, using the solutions described, it is possible to inject or extract even very high working fluid flow rates: for example, the ratio of injected mass flow rate to the mass flow rate upstream of the injection may be between 0.5 and 3; in the case of extraction, the ratio of the extracted mass flow to the one upstream of the extraction may be between 0.2 and 0.9.

All this occurs without significantly modifying the abduction system of the working fluid: this can be seen particularly by comparing FIG. 10 (turbine without injection/extraction) with FIG. 11 (the injection/extraction duct is made with minimal changes of the main induction duct of vapor). On the contrary, in order to insert the additional injection/extraction duct near the turbine radial stages, it would be necessary to act on the main abduction duct of vapor, by changing its geometry or by moving it, for example, by increasing the dead volume upstream of the first stator or by making the working fluid follow less linear paths. This would also change the design of the turbine case with all the easily imaginable complications, at least in terms of calculation, design, certification. Conversely, in order to achieve an injection/extraction near the axial stages, the main abduction duct would not be modified, but it would be essential to increase the axial cantilever of the turbine shaft with consequent structural resistance and roto-dynamic compatibility implications.

In addition, when making the injection in the angular stator, as this latter is characterized by a path between the longer blades of the other stators, this allows for a better mixing of the working fluid. In addition, the injection can advantageously take place in the portion 15 of the angular stator stage S4, which is ideally comprised between the fictitious surfaces 15' and 15", i.e. the injection begins across a first surface (15') corresponding to about 5-25% of the total expansion of the angular stator (referred to as the ratio between the inlet and outlet pressure up to the stator) and ends across a second surface (15") corresponding to an expansion level between 10 and 50%. Therefore, the expansion and therefore acceleration of the working fluid occur mainly occur downstream of the injection resulting in lower mixing losses.

Finally, by making the final release portion 14' of the injection/extraction duct 14, which is almost orthogonal with respect to the protrusion Y of meridian plan of the channel axis formed by two consecutive angular blades of the angular stator stage S4, it is possible to use the same geometry both for injection and extraction, without privileging either injection or extraction. For example, the thermodynamic cycle is normally performed on two levels: a vapor abduction in the main duct 13 and a vapor injection by means of the auxiliary duct 14. When district heating requirements are present, depending on the season, the vapor extraction is performed by using the same auxiliary duct. Another case may be that of industrial processes which change with a certain seasonality: therefore, in a certain period of the year the co-generation is carried out by using only the condensation heat without any need for vapor extraction at a higher temperature from the turbine, while in other periods of the year the need for higher temperatures remains, and then it becomes necessary to extract vapor from the turbine.

Figure 12:
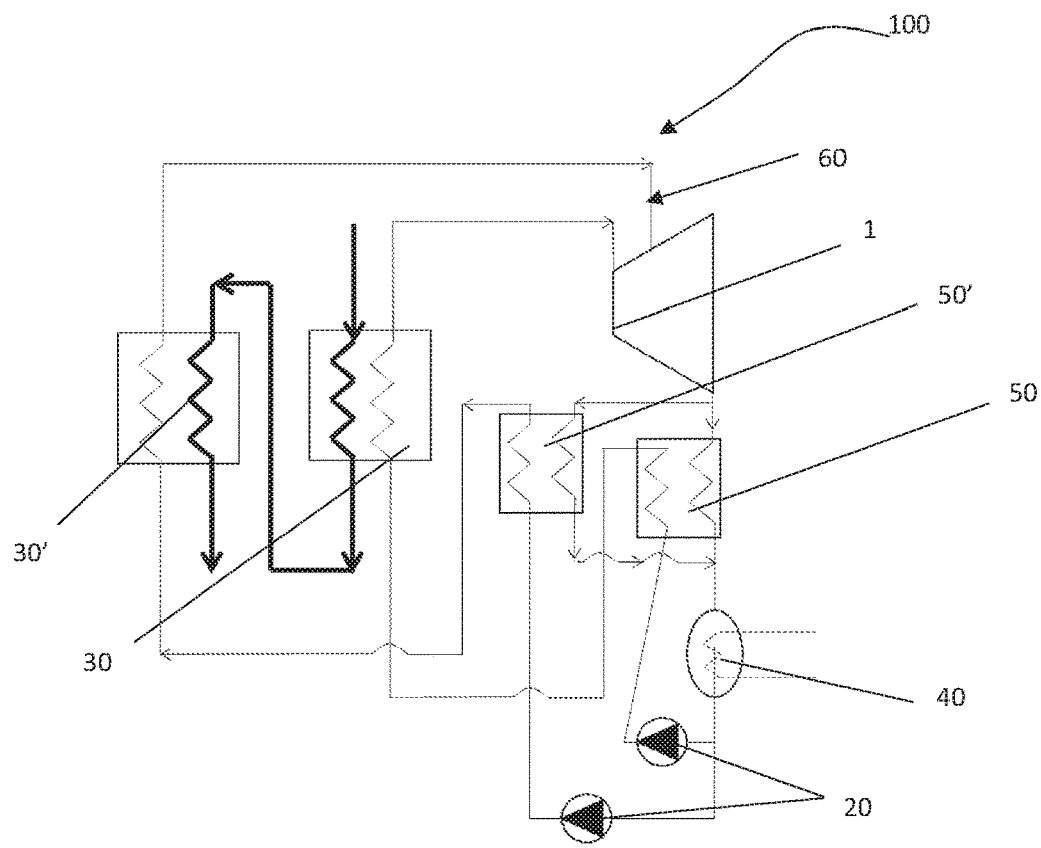
Figure 13:
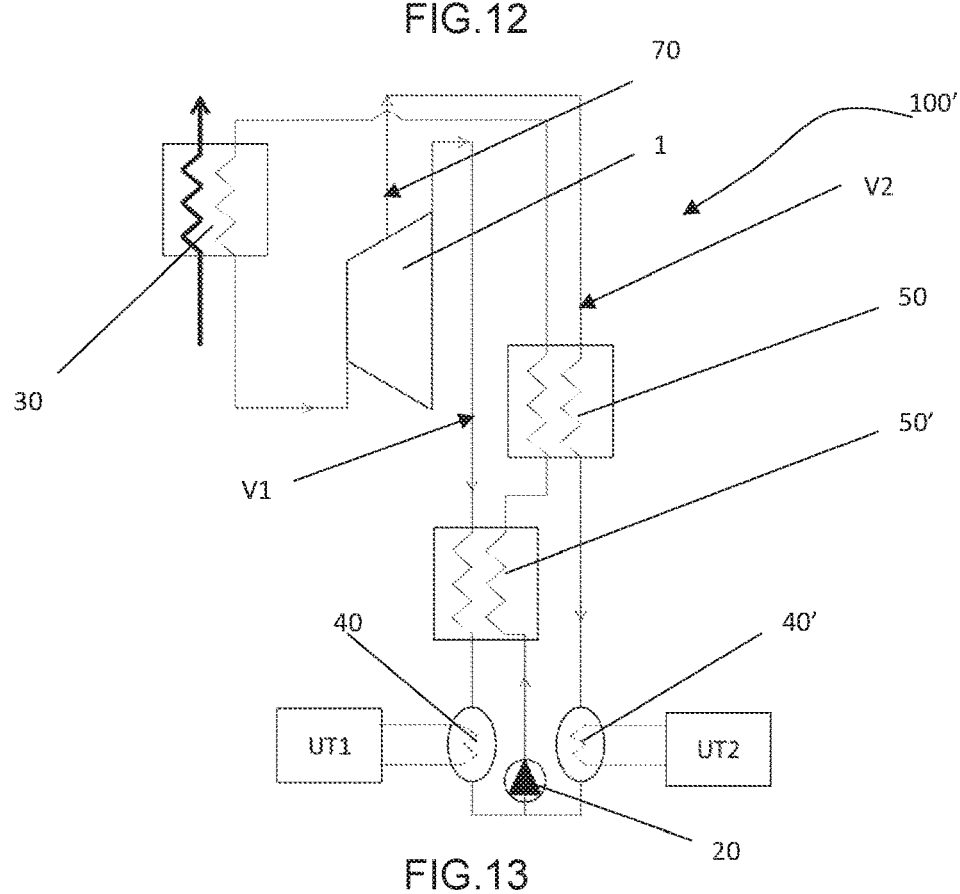

The mixed flow turbine provided with means for the injection/extraction of working fluid can be advantageously used in an organic Rankine cycle power plant 100, 100' as shown in FIGS. 12 and 13. As is known, such plant typically comprises at least one supply pump 20 for supplying an organic working fluid, in liquid phase, at least one heat exchanger 30. With reference to FIG. 12, in the heat exchanger, which in turn can comprise a preheater, an evaporator and possibly an overheater, the organic fluid is heated until its transformation into a vapor stage and its eventual overheating. At the exit of the heat exchanger, vapor crosses an expansion turbine —according to the present invention, the mixed flow turbine 1—so producing the useful work of the organic Rankine cycle. Such work is a useful mechanical work collected onto the turbine shaft which is rigidly connected with an electric machine. The working fluid finally passes through a condenser 40 bringing the same to the liquid phase in order to be again supplied by pump 20 to the heat exchanger 30. Advantageously, in order to increase the cycle efficiency, between the turbine 1 and the condenser 40 a heat recovery unit 50 can be inserted, which is a heat exchanger exchanging heat between the organic fluid in vapor phase, which is directed from the turbine 1 toward the condenser 40, and the organic fluid in liquid phase is pumped from the pump 20 to the heat exchanger 30. Advantageously, as shown in FIG. 12, the regenerators 50, 50' could be in the number of two, being used to preheat the liquid both upstream of the exchanger 30 and upstream of the exchanger 30'.

In particular, with reference to FIG. 12, the mixed flow turbine of the organic Rankine cycle plant 100 has means for the injection 60 of the second flow of working fluid. The means for injection 60 of the working fluid, in the previously described embodiments, can inject vapor at a pressure lower than that of the vapor supplying the turbine. In this case, the low pressure vapor generation can be made through an additional heat exchanger 30'.

With reference to FIG. 13, the mixed flow turbine plant of the organic Rankine cycle plant 100' has means for the extraction 70 of the second flow of working fluid. This plant thus dispenses, in addition to the main flow of vapor VI which once condensed (in the capacitor 40) will make heat available to a first user UT1, and a second vapor flow V2 once condensed (in the capacitor 40') will make heat available at a higher temperature, to a second user UT2. Thus, an advantage of using means for extraction 70 of the working fluid, in the previously described embodiments, in an organic Rankine cycle plant, consists in making possible the co-generation of energy, namely the simultaneous production of mechanical energy (usually transformed into electrical energy) and a high temperature heat. The heat produced is used for example for heating or district heating of buildings and/or manufacturing industrial processes. In FIG. 13 two regenerators 50 and 50' are shown in series, which preheat the fluid exiting the pump, by desiccating the vapor VI and V2.

In addition to the embodiments of the invention, as described above, it is to be understood that numerous further variants exist. It must also be understood that said implementation ways are only exemplary and do not limit either the invention or its applications, or its possible configurations. On the contrary, although the above description allows the craftsman to implement the present invention according to at least one of its exemplary configurations, it must be understood that numerous variations are conceivable of the components described, without for this reason departing from the subject of the invention as defined in the appended claims, which are literally interpreted and/or according to their legal equivalents.

The invention claimed is:

1. A mixed flow turbine for the expansion phase of a steam thermodynamic cycle or an organic Rankine cycle comprising:
   a first section in which a first expansion of a main flow of a working fluid takes place in a substantially radial direction, said first section comprising at least one row of stator blades and at least one rotor stage
   a second section in which a second expansion of the main flow of the working fluid takes place in a substantially axial direction, said second section comprising at least one row of stator blades and at least one rotor stage,
   between said first and second section, at least one angular row of stator blades which deflect the main flow of the working fluid from the initial radial direction to a substantially axial expansion direction,
   said turbine being characterized by means for injection and/or means for extraction of a second flow of the working fluid, accommodated within the angular row of stator blades; and
   wherein said means for injection and/or means for extraction of the second flow of the working fluid are configured so that the injection and/or means for extraction takes place in a portion of the angular row of stator blades delimited by a pair of surfaces, wherein the pair of surfaces includes, a first surface of the pair which corresponds to an expansion level of the working fluid between 5% and 25% and a second surface of the pair which corresponds to an expansion level of the working fluid between 10% and 50% of the overall expansion in the angular row of stator blades.

2. The turbine according to claim 1, wherein a mass flow of said second flow of the working fluid injected and a mass flow rate of said main flow of the working fluid, upstream of the injection, has a ratio ranging between 0.5 and 3.

3. The turbine according to claim 1, wherein a mass flow rate of said second flow of the working fluid extracted and a mass flow rate of said main flow of the working fluid, upstream of the extraction, has a ratio ranging between 0.2 and 0.9.

4. The turbine according to claim 1, wherein said means for injection and/or the means for extraction of the second flow of the working fluid comprise an auxiliary duct whose outlet release portion is orthogonal with respect to a projection on a meridian plane of an axis of a channel formed by two consecutive blades of the angular row of stator blades.

5. The turbine according to claim 1, wherein said means for injection and/or the means for extraction of the second flow of the working fluid comprise a chamber or a duct located in a substantially intermediate position of the angular row of stator blades.

6. The turbine according to claim 5, wherein said portion of the angular blades of the angular row of stator blades extends inside of an additional inlet duct to better guide the second flow.

7. The turbine according to claim 1, wherein said angular row of stator blades is shaped so that each blade duct diverges from each other and detached from adjacent one, to allow the income of the second flow, accelerated and guided by other stator ducts intermediate between said each blade ducts.

8. The turbine according to claim from 1, wherein said main flow exiting the rotor stage alternately feeds blade ducts connected to the second section of the turbine and stator ducts that convey the working fluid out of the turbine.

9. An Organic Rankine Cycle system that uses an organic working fluid, said Organic Rankine Cycle system comprises:
- at least one supply pump for pumping the organic working fluid in liquid phase,
- at least one heat exchanger, which exchanges heat between a hot source and the organic working fluid, the organic working fluid exiting the heat exchanger is in vapor phase,
- at least one expansion turbine, which expands the vapor of the organic working fluid,
- at least one condenser,
  - wherein the at least one expansion turbine is the mixed flow turbine according to claim 1.

10. The Organic Rankine cycle system according to claim 9, wherein said means for injection and/or extraction of the second flow of the working fluid are configured to inject vapor at a lower pressure than the pressure of the vapor that feeds the turbine.

11. The Organic Rankine cycle system according to claim 10, further comprising an additional heat exchanger configured to generate vapor at a lower pressure than the pressure of the vapor that feeds the mixed flow turbine.

12. The Organic Rankine cycle system according to claim 11, further comprising at least a regenerator or two regenerators to preheat the working fluid in a liquid phase upstream of the at least one heat exchangers used for the vapor generation.

13. The Organic Rankine cycle system according to claim 9, wherein said means for injection and/or extraction of the second flow of the working fluid are configured to obtain energy cogeneration.

14. The Organic Rankine cycle system according to claim 13, further comprising two regenerators in series.

\* \* \* \* \*